H. L. ALLEN.
FLEXIBLE COUPLING.
APPLICATION FILED NOV. 4, 1912.
1,114,326.
Patented Oct. 20, 1914.
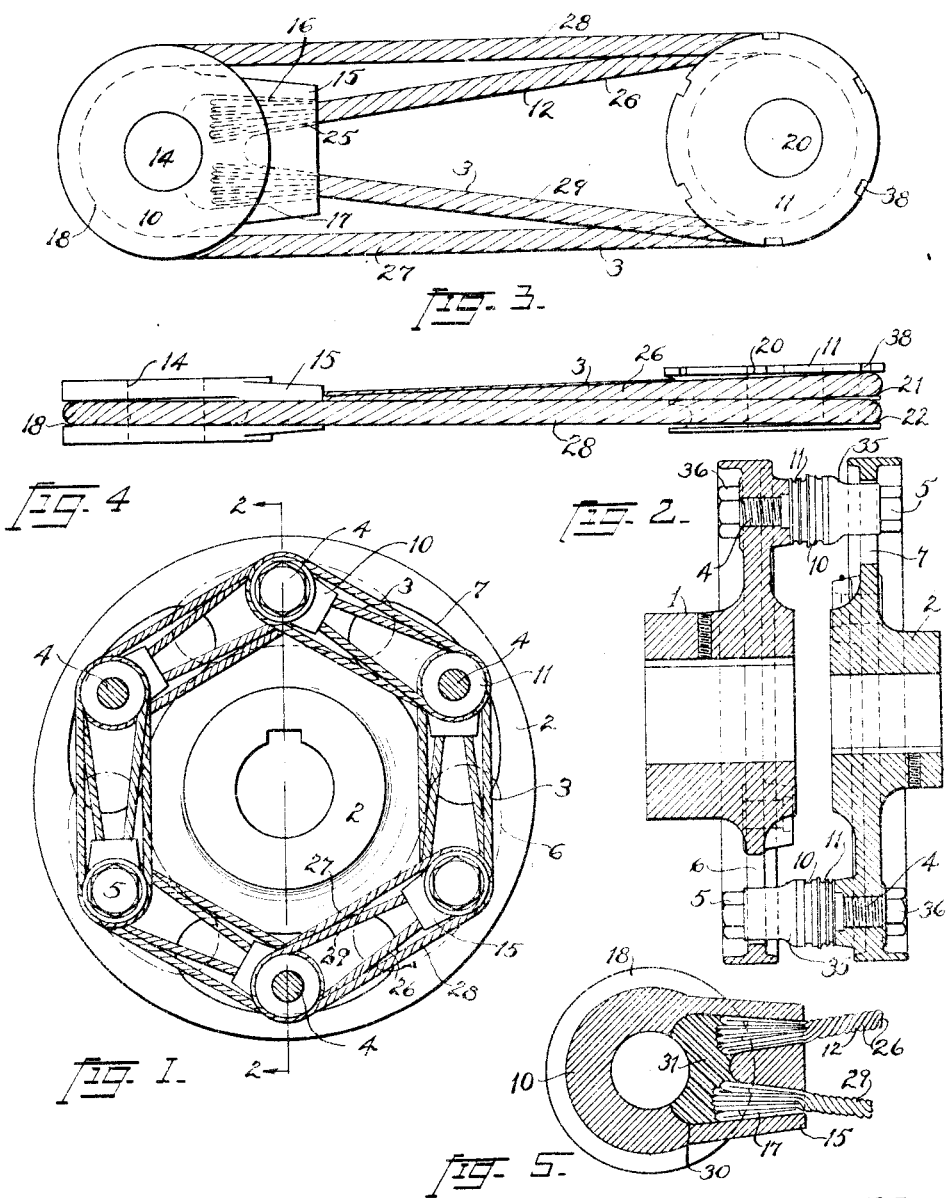
WITNESSES:
Oliver M. Kappler
Justin T. Machlin
INVENTOR
Harry L. Allen,
BY Albert H. Bates
ATTORNEY

UNITED STATES PATENT OFFICE.

HARRY L. ALLEN, OF CLEVELAND, OHIO.

FLEXIBLE COUPLING.

1,114,326.   Specification of Letters Patent.   Patented Oct. 20, 1914.

Application filed November 4, 1912. Serial No. 729,351.

*To all whom it may concern:*

Be it known that I, HARRY L. ALLEN, a citizen of the United States, residing at Cleveland, in the county of Cuyahoga and State of Ohio, have invented a certain new and useful Improvement in Flexible Couplings, of which the following is a full, clear, and exact description, reference being had to the accompanying drawings.

The object of this invention is to provide a simple and effective coupling adapted to connect two shafts which are not in strict alinement.

My coupling provides driving and driven members (which may be wheels or spiders on the respective shafts) and a polygon of links between the members connected to them alternately at the angles of the polygon.

The present invention is concerned principally with the construction and adjustment of the flexible links which constitute the polygon mentioned. These links each consist of heads connected by a flexible cable, and, more particularly, by a cable secured at its ends to one of the heads and passing intermediately in opposite directions around the other head and then looping around the head first mentioned. By this means I attain great flexibility of the links, and, at the same time, proper strength to enable an effective driving. Moreover, by eccentrically mounting one of the heads of each link, I provide a simple adjustment for taking up the slack of the cables.

The invention is hereinafter more fully explained and the essential characteristics are set out in the claims.

In the drawing Figure 1 is a section between the driving and driven members of the coupling, showing the polygon of links and one of the members, the studs connected with the other member being shown in section, and certain openings in the latter member being represented by broken lines; Fig. 2 is a cross section of the coupling lengthwise of the shafts to be coupled as indicated by the line 2—2 on Fig. 1; Fig. 3 is a side elevation of one of the links; Fig. 4 is an edge view of such link; Fig. 5 is a detail, being a section through one of the heads of a link, showing the means for securing the ends of the cable.

Referring by numerals to the parts shown in the drawings, 1 and 2 represent the driving and driven members of the coupling, which are designed to be rigidly secured to the two shafts which it is desired to couple.

3 indicates flexible links which are arranged in a polygon (a hexagon being shown), and 4 indicates studs connecting the salient angles of the polygon with the members 1 and 2 alternately. Each stud passes through the head of two links, which overlap each other, as will be understood. Each link 3 comprises a head 10, a head 11, and a flexible cable 12 connecting the two heads. The head 10 is of a general disk form, having an opening 14 surrounding the stud and provided with an extension or boss 15 having inwardly enlarging recesses 16 and 17, for securing the ends of the cable, as hereinafter explained. About the periphery of this head is a groove 18 which extends for a semi-circumference on the outer edge of the head. The head 11 is in the form of a disk and has a bolt opening 20, and, about the periphery two grooves 21 and 22. The cable 12, which is preferably of wire, has one end 25 secured within the recess 16, and, from this point one reach, designated 26, of the cable, passes in an outwardly flaring direction to the groove 21 of the head 11 and extends about this groove for a little more than a semi-circumference and then passes to the groove 18 in the head 10, this reach being designated 27. The cable then lies in the groove 18 and, leaving the opposite side of that groove, passes by a reach 28 to the groove 22 and about that groove for approximately a semi-circumference, and then passes by a reach 29 to the cavity 17 in the extension 15 of the head 10. The cavities 16 and 17 are flared inwardly from the end of the boss 15, as shown in Figs. 3 and 5, and then connect together by a cavity 30 which is in communication with the bore 14. In this cavity 30 I may pour molten lead, Babbitt, or similar material, indicated at 31, which will solidify and firmly secure the ends of the cable to the boss. The cables, it is to be understood, have their ends first passed through the cavities mentioned and out through the bore 14; then the wires near the ends are separated and the ends bent back on themselves for a short distance; then the ends are pulled back into the cavities, as shown in Fig. 5; and the molten lead poured into place through the bore of the head, the lead passing in between the strands of the cable and over the ends thereof. Then the bore 14 is reamed out.

When the cables for the various links have been secured to their respective heads 10, as above explained, the coupling is ready for assembling. The heads 11 are placed within the loops of the cable, as shown in Figs. 3 and 4 and the heads are put over the studs 4, which may be screw-bolts having heads 5 and are screwed or otherwise secured to the two members of the coupling alternately. The ends of two links, of course, go on each stud, and the links are preferably turned in the same direction about the polygon. That is to say, each stud 4 carries one head 10 and one head 11.

When screw-bolts are used as the securing-studs, washers 35 are placed over the shanks of the bolt, the bolts are passed through the two heads 10 and 11 of adjacent links, are then screwed into the driving or driven member, as the case may be, and then a nut 36 is preferably screwed onto the projecting end of the bolt to effectively lock it.

In order to adjust the links to make the cables taut in assembling, and to readjust them in case of wear, I mount the head 11 eccentrically on its stud 4, the holes 20 being off the center for this purpose. Then, to tighten or loosen the cables, it is only necessary to give the head a portion of a rotation about the stud and clamp it in adjusted position. Such rotation may be given it by a suitable spanner wrench engaging notches 38 in the periphery of the head. When adjusted, the head is clamped, as by tightening the bolts 4, by a wrench applied to the heads 5 thereof. To allow the easy loosening of the bolts and tightening thereof beyond the other member of the coupling, I lengthen the bolts and provide the elongated washers 35, heretofore referred to, which carry the bolt heads to a position where they are easily accessible beyond the opposite side of the other member of the coupling, each member of the coupling having openings through which the bolts freely extend. These openings are preferably of an arc shape and are designated 6 and 7 in the drawings. To adjust the links, it is only necessary to loosen the jam nuts 36 and apply a wrench on the bolt heads 35 and a spanner on the head 11. Then when the spanner has properly positioned the head, the bolt is screwed home and the jam nut returned into place.

It will be seen from the above description, that my coupling is very simple in construction and that there is nothing about it to get out of order. The cable-form of the link gives great flexibility to the coupling, enabling satisfactory driving with shafts considerably out of alinement or at a material angle to each other; while the eccentric mounting of the link-heads allows links to be easily put in place when the cable is slack, the cable being then drawn taut by turning the head. This also provides for keeping the cable taut, notwithstanding wear. I have shown the cable looping once about the head 10 and twice about the head 11. It is to be understood that this may be reduced to a single looping for light couplings, while for heavier work the number of turns may be increased. The two grooves in the head 11 and the one groove in the head 10 are to be taken as illustrative of any number of grooves, those of the head 11 preferably exceeding by one those of the head 10.

Having thus described my invention, what I claim is:

1. In a flexible coupling, the combination, with a driving member and a driven member, of a polygon of separate links connected alternately at its angles to the respective members, each link consisting of two heads, one connected with one member and the other with the other and a cable secured at its ends to one head and passing intermediately around the other head.

2. In a flexible coupling, the combination, with a driving and a driven member, of a link having two heads, one connected with one member and the other with the other and having a flexible cable secured at its ends to one head and passsing intermediately around the other head and then looping around the head to which the ends are secured.

3. In a flexible coupling, the combination, with a driving and a driven member, of a link secured at one end to one member and at the other end to the other member, said link comprising a head having an opening for the passage of a securing bolt, a head at the other end of the link having an opening for the passage of a securing bolt, and a flexible cable having its ends secured in a recess in the head first mentioned and intermediately passing around the other head.

4. In a flexible coupling, a link consisting of a head with a boss on one side, a second head having a plurality of grooves side by side and a flexible cable having its ends secured within the boss on the first mentioned head and intermediately lying in reaches around the second head in the grooves thereof and then looping around the first mentioned head.

5. A link for a flexible coupling consisting of a head having a securing opening and a projecting boss and at least one groove in the head on the opposite side from the boss, a second head having at least two grooves therein, and a flexible cable having its end secured within the boss on the first mentioned head and intermediately looping around the heads, the cable making as many loops as there are grooves in the second head.

6. In a flexible coupling, the combination, with a driving and a driven member, of a link connected at one end with one member and at the other end with the other member, said link comprising two heads and a connecting cable which is anchored to one head and intermediately lies in a groove about the other head, the last mentioned head being eccentrically mounted whereby it may be turned to stretch the cable.

7. In a flexible coupling, the combination, with a driving and a driven member, of a link secured at one end to one member and at the other end to the other member, this link comprising a pair of heads and a flexible cable, said cable having its ends secured to one head and passing intermediately about the periphery of the other head, the last mentioned head having a peripheral groove which the cable occupies and having an eccentric hole through which passes a bolt securing it to the member of the coupling.

8. The combination, with a driving and a driven member, of a flexible link connected at one end to one member and at the other end to the other member, said link comprising a pair of heads, one of which has a boss, the other of which has peripheral grooves and an eccentric opening, through which passes a bolt securing it to the member, and a cable secured at its ends within said boss and passing intermediately about the other head, occupying the grooves therein and looping about the first mentioned head, the eccentrically mounted head having means whereby it may be turned to adjust the tension on the cable.

9. In a flexible coupling, the combination, with a driving and a driven member, of a polygon of links between them, bolts connecting such polygon at its angles respectively and alternately with the members of the coupling, each member of the coupling having slots through which the bolts from the opposite coupling extend, whereby easy access to the bolt head is provided, each link of the coupling consisting of two heads and a connecting cable and being provided with means for adjusting it at its bolt by turning one of the heads of the links when the securing bolt is loosened.

10. In a flexible coupling, the combination of driving and driven members side by side, a polygon of links between the members, bolts securing the polygon at its angles alternately to one member and the other, said links each comprising two heads connected by a flexible cable, bolts each passing through the head of one link and the head of the adjacent link, one of the heads of each link being eccentrically mounted on its bolt, and there being means for turning such eccentric head when the bolt is loosened.

In testimony whereof, I hereunto affix my signature in the presence of two witnesses.

HARRY L. ALLEN.

Witnesses:
ALBERT H. BATES,
BRENNAN B. WEST.